Aug. 18, 1931. A. M. LEE Re. 18,155
DELIVERY APPARATUS
Original Filed Dec. 3, 1926 2 Sheets-Sheet 1
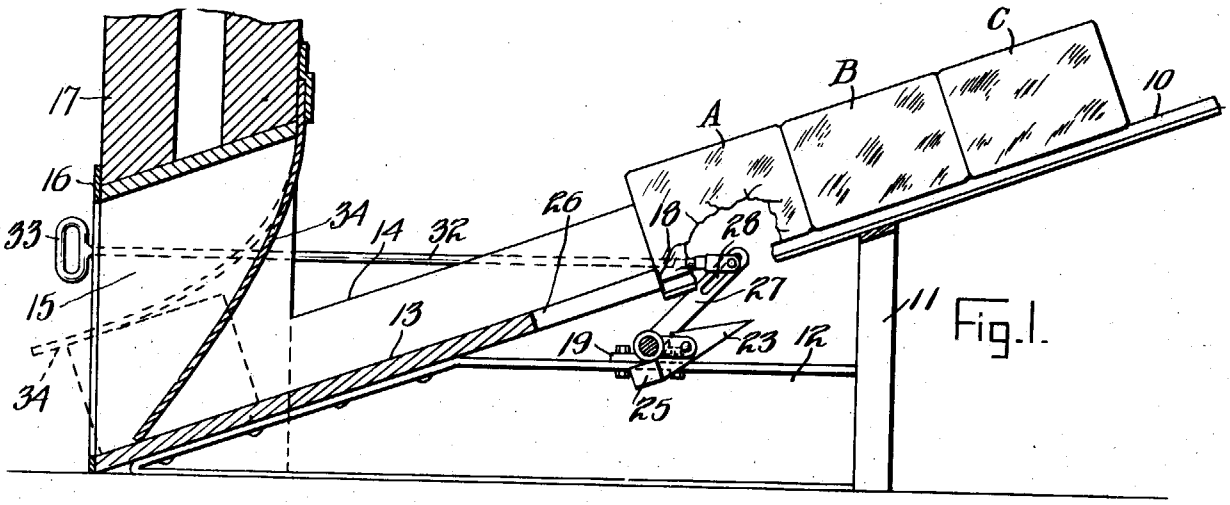
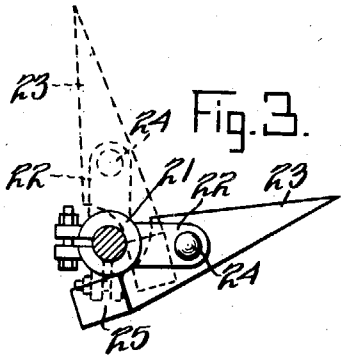
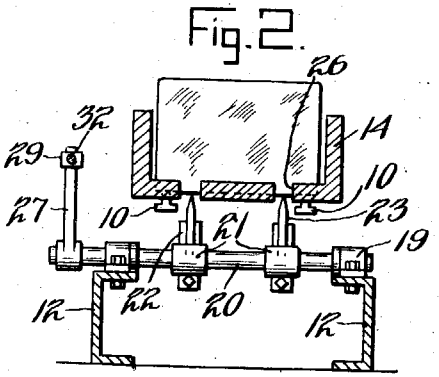
Inventor
Aubrey M. Lee.
By E. W. Bedford
Attorney Aug. 18, 1931. A. M. LEE Re. 18,155

DELIVERY APPARATUS

Original Filed Dec. 3, 1926 2 Sheets-Sheet 2

Inventor
Aubrey M. Lee

By E. W. Bedford

Attorney

Reissued Aug. 18, 1931

Re. 18,155

UNITED STATES PATENT OFFICE

AUBREY M. LEE, OF DALLAS, TEXAS, ASSIGNOR, BY MESNE ASSIGNMENTS, TO GENERAL ICE SCORING MACHINE COMPANY, OF DALLAS, TEXAS, A CORPORATION OF DELAWARE

DELIVERY APPARATUS

Original No. 1,647,530, dated November 1, 1927, Serial No. 152,349, filed December 3, 1926. Application for reissue filed May 11, 1929. Serial No. 362,424.

This invention relates to new and useful improvements in delivery apparatuses.

The object of the invention is to provide a delivery device whereby articles such as blocks of ice, boxes, and the like, normally held in restraint, may be released and delivered by gravity when desired.

A particular object of the invention is to provide an inclined delivery chute in conjunction with an inclined supply track, together with means for normally holding the articles in restraint on the track and means easily operated for displacing the articles successively from the track to the chute, whereby said articles are permitted to slide down said chute and delivered by gravity.

An important object of the invention resides in the provision of a simple and effective means for lifting the articles from the track to the chute and starting the same on their passage down the chute.

A construction designed to carry out the invention will be hereinafter described, together with other features of the invention.

Figure 4:
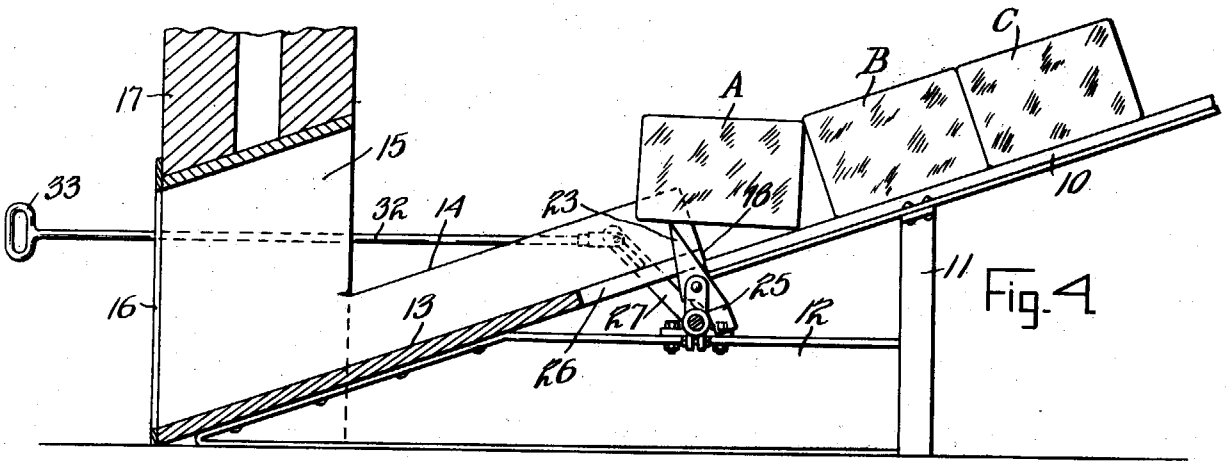
Figure 6:
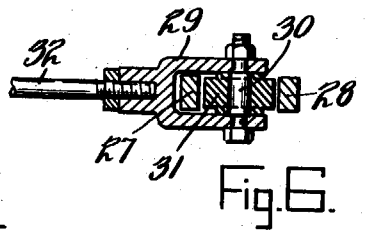
Figure 5:
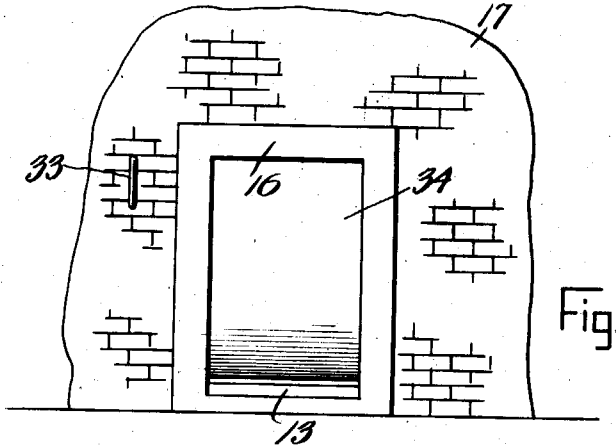

The invention will be more readily understood from a reading of the following specification and by reference to the accompanying drawings, in which an example of the invention is shown and wherein:

Figure 1 is a vertical sectional view of a delivery apparatus constructed in accordance with my invention, Figure 2 is a transverse vertical sectional view of the same, Figure 3 is a detail of one of the dogs, showing it in its normal position in full lines and in its elevating position in dotted lines, Figure 4 is a view similar to Fig. 1, showing the parts in the elevating position in full lines, Figure 5 is a front elevation of the apparatus, and Figure 6 is a detail of the clevis connection.

In the drawings the numeral 10 designates a supply track, which is inclined and has its lower end supported on a standard 11 which is mounted in the inner end of a base, formed by flanged side members 12. A chute 13 is fastened on the forward ends of the side members and is inclined at the same pitch as the track 10, or at any other desirable pitch. The chute has side walls 14 and is provided at its lower end with a housing 15 having a frame 16, whereby it is secured in the wall 17 of the structure in which the apparatus is mounted. It is preferable to make the track 10 of a pair of T-bars which are inverted and spaced as is shown in Fig. 2. These bars have their lower ends abutting the upper end of the chute, but are spaced below said chute so that its upper edge 18 forms a stop, or abutment.

Blocks of ice A, B and C, or other objects, when placed on the track 10 will slide down the same, the lower front edge of the block A engaging the stop 18, as is shown in Fig. 1. The blocks will be held in this position until the block A is dislodged. It will be seen that by elevating the front end of the block A and moving it forwardly, it will be deposited in the chute 13 and will thus slide down the same and be delivered.

On the members 12 I mount bearing boxes 19 in which a transverse rock shaft 20 is journaled. On the shaft I fasten a pair of split collars 21, each having a pair of ears 22. Between each pair of ears, a dog 23 is pivoted on a pin 24, as is shown in detail in Fig. 3. Each dog is tapered to a point and has a tripping weight 25 at is opposite end. The weight acts as a counter-balance, but the dog 23 has sufficient weight outwardly beyond the pivot 24 to normally hold the weight up against the collar 21, as is shown in full lines in Figs. 1 and 3. The bottom of the chute 13 has slots 26 extending downwardly from the edge 18 located over the dogs so that the latter may swing downwardly through said slots.

For rocking the shaft 20, I provide a lever 27 which is fastened on one end of said shaft and has a slot 28 at its outer end. A clevis 29 is provided with a shouldered axle 30 carrying a roller 31 engaged in the slot 28. An operating rod 32 extends outwardly from the clevis through the wall 17 and terminates in a handle 33.

Normally the parts occupy the positions shown in Fig. 1. When it is desired to deliver a block of ice, or other object, the operator grasps the handle 33 and pulls the rod 32 outwardly, whereby the lever 27 is swung. Owing to the slot 28 and roller 31, the rod maintains a substantially horizontal position as the lever is swung. When the lever is swung, the dogs 23 are moved upwardly through the track 10 and engage in the forward bottom portion of the block A, thus elevating it as is shown in Fig. 4. When the points of the dogs have been carried over the center of the shaft 20, as is indicated in Fig. 4, the weight of the block A will continue to swing the dogs forwardly, thus permitting said block, which has been raised above the edge 18, to fall forwardly on to the bottom of the chute and thus slide down the same, the dogs being carried down in to the slots 26. A curtain, or other door, 34 may be provided at the housing 15 for closing the chute. The block will be expelled from the chute and thus delivered on the platform beyond the frame 16.

When the block A is delivered to the chute, the blocks B and C will slide down the track 10, so that the front of the block B comes to rest against the edge 18. When the rod 32 is pushed inwardly and the arm 27 returned, the dogs 23 will travel through the slots 26 and under the block B, finally coming to rest in the position shown in Fig. 1, due to the counter-balancing weights 25. The operation is easy, fast and effective and the dogs readily clear themselves.

Various changes in the size and shape of the different parts, as well as modifications and alterations, may be made within the scope of the appended claims.

What I claim is:

1. In a delivery apparatus, the combination of an inclined chute, an inclined track, a fixed stop between the track and the chute, pivoted dogs mounted below the track and chute and having reduced ends for engaging the articles to be delivered, a lever for swinging said dogs to engage their reduced ends under the article to be delivered and for returning them to their normal position, said dogs being counter-balanced to swing them to an upright position and means for actuating the lever.

2. In a delivery apparatus, the combination of an inclined chute having slots at its upper end, an inclined track, a fixed stop between the track and the chute, a shaft supported below the track and chute, collars mounted on said shaft, counter-balanced dogs pivoted to said collars and adapted to swing through the slots of the chute, a lever attached to said shaft for rocking it, and means for swinging the lever.

3. In a delivery apparatus, an inclined chute having a housing at its lower end and slots in its bottom at its upper end, an inclined track having its lower end below the upper end of the chute whereby the upper end of the chute provides a stop for articles sliding down the track, a shaft below the chute and track, collars fastened on the shaft, dogs pivoted intermediate their ends on said collars, each having a point at one end and a counter-balancing weight at the other end, a lever on said shaft for rocking the same to elevate the dogs for swinging their points through the slots of the chute, and a rod connected with said lever extending forwardly of the housing and having a handle on its forward end.

4. In a delivery apparatus, the combination of an inclined chute, an inclined track, a fixed stop between the track and the chute, a shaft supported below the track and chute, collars mounted on said shaft, counter-balanced dogs pivoted to said collars and adapted to swing to engage articles on the track and lift the same to the chute, a lever attached to said shaft for rocking it, and means for swinging the lever.

5. In a delivery apparatus, the combination of an inclined chute, a housing at the lower end of the chute having an outwardly movable closure, an inclined track contiguous to the upper end of the chute, a fixed stop between the chute and the track, a pair of swinging dogs having upwardly directed ends for engaging an article resting on the track, and means for swinging the dogs to engage and elevate an article from the track to the chute.

6. In a delivery apparatus, the combination of an inclined chute, a housing at the lower end of the chute having an outwardly movable closure, an inclined track contiguous to the upper end of the chute, a fixed stop between the chute and the track, a pair of swinging dogs having upwardly directed ends for engaging an article resting on the track, means for swinging the dogs to engage and elevate an article from the track to the chute, and means for swinging said dogs to an upright position.

7. In a delivery apparatus, the combination of an inclined chute, a housing at the lower end of the chute having an inclined track contiguous to the upper end of the chute, a fixed stop between the chute and the track, a pair of swinging dogs having upwardly directed ends for engaging an article resting on the track, means for swinging the dogs to engage and elevate an article from the track to the chute, and counter-balancing weights on said dogs below their pivots for swinging the same to an upright position.

8. In a delivery apparatus of the kind described, the combination of an inclined chute, an inclined track, the end of the chute being raised above the end of the track to form a stop for articles sliding down the track, dogs pivotally mounted below the track and the chute and having pointed ends for engaging the articles to be delivered, a lever for operating said dogs to cause them to engage under the articles to be delivered and to return them to inactive position, said pivoted mounting of said dogs permitting the weight of said article to rotate said dog to release said article, substantially as set forth.

9. The combination with the wall of an ice storage house having an opening therethrough, of a housing secured in said opening, a flexible closure secured to said wall adjacent the top of said housing and bent to extend into said opening in the direction of travel of blocks of ice and normally fitting relatively air tight against the sides and bottom of said opening, to close said opening, an inclined chute arranged to deliver ice through the opening, a stop, and manually operable means for elevating blocks of ice to cause them to move over the stop and slide down the chute, substantially as set forth.

10. The combination with the wall of an ice storage house having an opening therethrough of a flexible closure secured to said wall adjacent the top of said opening and bent to extend into said opening in the direction of travel of blocks of ice and normally fitting relatively air tight against the sides and bottom of said opening, an ice chute extending through the opening, a stop for blocks of ice and manually operable means for disengaging the blocks of ice from said stop, substantially as set forth.

In witness whereof, I have hereunto set my hand at Dallas, Texas, this 6th day of May, 1929.

AUBREY M. LEE.